United States Patent [19]
Deitz et al.

[11] Patent Number: 5,484,898
[45] Date of Patent: Jan. 16, 1996

[54] FIBRE-REACTIVE DISAZO DYES WHICH CONTAIN THREE TRIAZINE GROUPS

[75] Inventors: Rolf Deitz, Basle; Athanassios Tzikas, Pratteln, both of Switzerland

[73] Assignee: Ciba-Geigy Corporation, Tarrytown, N.Y.

[21] Appl. No.: 241,217

[22] Filed: May 10, 1994

[30] Foreign Application Priority Data

May 14, 1993 [CH] Switzerland ............................. 1483/93

[51] Int. Cl.$^6$ ........................... C09B 62/09; D06P 1/382; D06P 3/66
[52] U.S. Cl. ..................... 534/612; 534/634; 534/797; 8/549
[58] Field of Search ..................... 534/612, 634

[56] References Cited

U.S. PATENT DOCUMENTS

| | | |
|---|---|---|
| 4,066,389 | 1/1978 | Riat ................................. 8/41 |
| 4,988,802 | 1/1991 | Loeffler et al. ....................... 534/634 |
| 5,200,511 | 4/1993 | Loeffler ................................. 534/634 |
| 5,216,137 | 6/1993 | Loeffler ................................. 534/634 |
| 5,223,607 | 6/1993 | Loeffler ................................. 534/634 |

FOREIGN PATENT DOCUMENTS

| | | |
|---|---|---|
| 0464448 | 1/1992 | European Pat. Off. . |
| 0465939 | 1/1992 | European Pat. Off. . |
| 0511523 | 11/1992 | European Pat. Off. . |
| 2601043 | 7/1976 | Germany . |
| 62-7765 | 1/1987 | Japan . |

OTHER PUBLICATIONS

Patent Abst of Japan, vol. 9, #200 p. 124 C-298
Hibara, Chemical Abstracts, 106:215491d (1987).
Takimoto et al, Chemical Abstracts, 112:58477h (1990).

Primary Examiner—Robert W. Ramsuer
Assistant Examiner—Fiona T. Powers
Attorney, Agent, or Firm—Kevin T. Mansfield

[57] ABSTRACT

The invention relates to compounds of formula

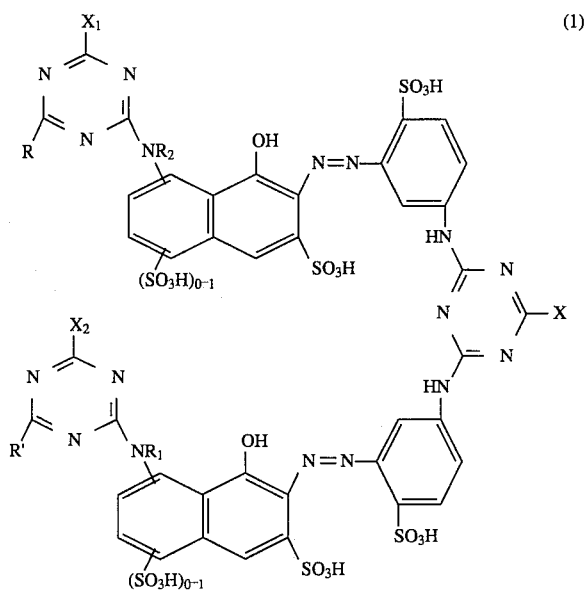

wherein the variables are as defined in the claims. The compounds are suitable for use as dyes, especially for dyeing and printing cellulosic fibre materials, and give dyeings and prints of good fastness properties.

13 Claims, No Drawings

FIBRE-REACTIVE DISAZO DYES WHICH CONTAIN THREE TRIAZINE GROUPS

The present invention relates to novel fibre-reactive dyes which are suitable for dyeing cellulosic fibre materials from an aqueous bath and for printing cellulosic fibre materials.

Specifically, the invention relates to compounds of formula

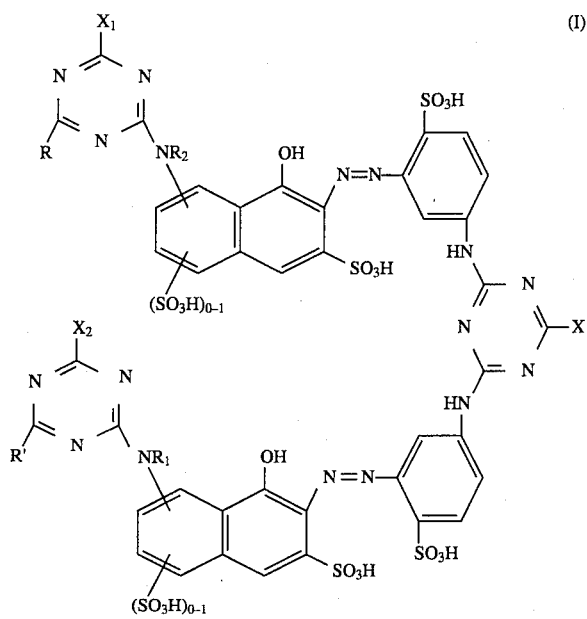

wherein

X, $X_1$ and $X_2$ are each independently of one another fluoro, chloro, bromo, hydroxy, 3-carboxypyridin-1-yl or 3-carbamoylpyridin-1-yl, $R_1$ and $R_2$ are each independently of the other hydrogen, $C_1$–$C_4$alkyl or $C_1$–$C_4$alkyl which is substituted by halogen, hydroxy, cyano, C–$C_4$alkoxy, $C_1$–$C_4$alkoxycarbonyl, carboxyl, sulfo or sulfato, and R and R' are each independently of the other amino or amino which is substituted by non-reactive radicals, or are $C_1$–$C_4$alkoxy, phenoxy, $C_1$–$C_4$alkylthio, N-$C_1$–$C_4$alkylpiperazino or morpholino.

$C_1$–$C_4$Alkyl is typically methyl, ethyl, n-propyl or isopropyl or n-butyl, isobutyl, sec-butyl or tert-butyl.

$C_1$–$C_4$Alkoxy is typically methoxy, ethoxy, n-propoxy or isopropoxy or n-butoxy, isobutoxy, sec-butoxy or tert-butoxy.

Halogen is typically fluoro, bromo or, preferably, chloro.

$C_1$–$C_4$Alkoxycarbonyl is typically methoxycarbonyl, ethoxycarbonyl, n-propoxycarbonyl or isopropoxycarbonyl or n-butoxycarbonyl, isobutoxycarbonyl, sec- or tert-butoxycarbonyl. Methoxycarbonyl or ethoxycarbonyl is preferred.

$C_1$–$C_4$Alkylthio is typically methylthio or ethylthio.

Sulfo groups present in the compounds of formula (1) may be in the the form of the free acid —$SO_3H$ as well as in salt form, typically as alkali metal salt, alkaline earth metal salt or ammonium salt or as the salt of an organic amine. Illustrative examples are the sodium, potassium, lithium or ammonium salt or the salt of triethanolamine. The compounds of formula (1) may also be in the form of mixed salts, typically as lithium/sodium or lithium/ammonium salt or as sodium/lithium/ammonium salt.

Illustrative examples of suitable substituents $R_1$ and $R_2$ are hydrogen, unsubstituted $C_1$–$C_4$alkyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl and β-sulfatoethyl.

$R_1$ and $R_2$ are each independently of the other preferably methyl, ethyl or hydrogen and are most preferably each hydrogen.

R or R' defined in formula (1) as amino which is substituted by non-reactive radicals will be typically taken to mean —$NH_2$, N-mono- or N,N-di-$C_1$–$C_4$alkylamino which may each be unsubstituted or substituted in the alkyl moiety by e.g. hydroxy, carboxy, sulfo, sulfato or $C_1$–$C_4$alkoxy; cyclohexylamino; phenylamino or phenylamino which is substituted in the phenyl moiety by e.g. $C_1$–$C_4$alkyl, $C_1$–$C_4$alkoxy, carboxy, sulfo or halogen; N-$C_1$–$C_4$-alkyl-N-phenylamino which is unsubstituted or substituted in the phenyl moiety by $C_1$–$C_4$alkyl, $C_1$–$C_4$alkoxy, carboxy, sulfo or halogen, and is unsubstituted or substituted in the alkyl moiety by hydroxy, $C_1$–$C_4$alkoxy, sulfo or sulfato.

R und R' defined as unsubstituted or substituted amino are each independently of the other preferably amino, methylamino, ethylamino, carboxymethylamino, β-sulfoethylamino, β-sulfatoethylamino, β-hydroxyethylamino, N,N-di-β-hydroxyethylamino, cyclohexylamino, o-, m- or p-methylphenylamino, o-, m- or p-methoxyphenylamino, o-, m- or p-sulfophenylamino, 2,4- or 2,5-disulfophenylamino, o-carboxyphenylamino, N-methyl-N-phenylamino, N-methyl-N-phenylamino or N-hydroxyethyl-N-phenylamino. The particularly preferred meanings of R and R' as unsubstituted or substituted amino are amino, o-, m- or p-sulfophenylamino, 2,5-disulfophenylamino, methylamino, ethylamino, β-hydroxyethylamino, N,N-di-β-hydroxyethylamino, N-methyl-N-phenylamino, N-ethyl-N-phenylamino and N-hydroxyethyl-N-phenylamino.

R nd R' defined as $C_1$–$C_4$alkylthio are each independently of the other preferably methylthio or ethylthio.

Preferred meanings of R and R' are each independently of the other amino, N-mono- or N,N-di-$C_1$–$C_4$alkylamino which may each be unsubstituted or substituted in the alkyl moiety by hydroxy or sulfo; phenylamino which is unsubstituted or substituted in the phenyl moiety by methyl, ethyl, methoxy, ethoxy, carboxy, sulfo or chloro; N-$C_1$–$C_4$alkyl-N-phenylamino which is unsubstituted or substituted in the alkyl moiety by hydroxy; morpholino or N-$C_1$–$C_2$alkylpiperazino.

Most preferably R and R' are amino, N-$C_1$–$C_2$alkylamino, β-sulfoethylamino, β-hydroxyethylamino, N,N-di-β-hydroxyethylamino, o-, m- or p-sulfophenylamino, 2,5-disulfophenylamino, N-$C_1$–$C_2$alkyl-N-phenylamino, N-hydroxyethyl-N-phenylamino or N-$C_1$–$C_2$alkylpiperazino.

R and R' may be identical or different and are most preferably identical substituents.

X, $X_1$ and $X_2$ are each independently of the other preferably hydroxy or, most preferably, chloro or fluoro. A particularly preferred embodiment of the invention relates to compounds of formula (1), wherein X is chloro and $X_1$ and $X_2$ are each fluoro.

Particularly interesting compounds are those of formula

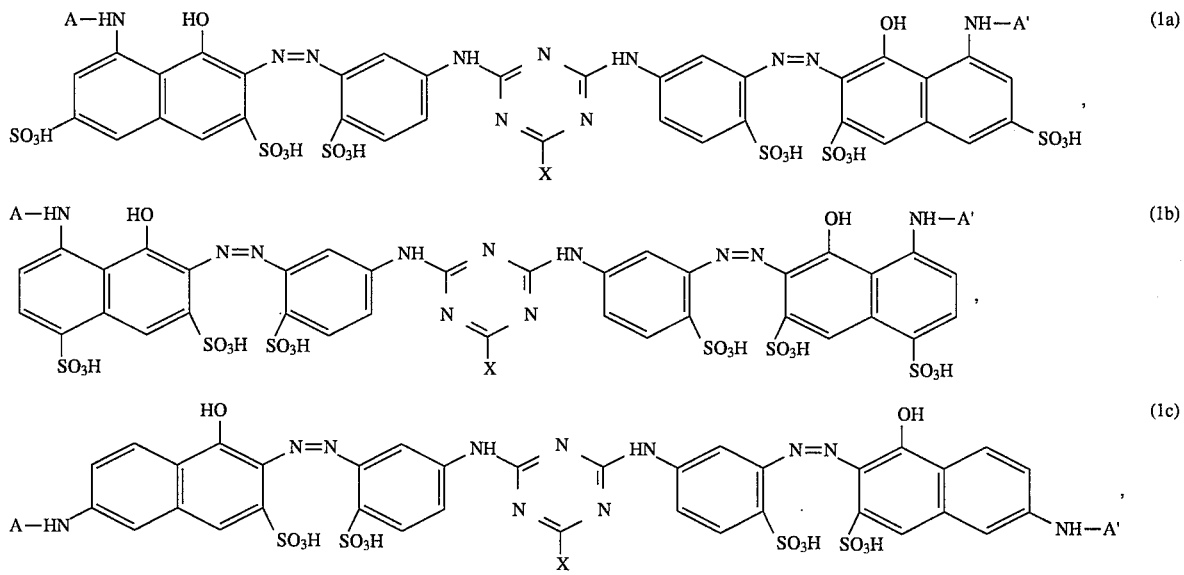

wherein A and A' are each independently of the other a radical of formula

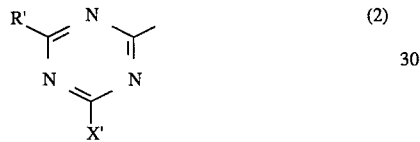

X and X' are each independently of the other fluoro or chloro, and R' has the meanings and preferred meanings as previously given.

Particularly preferred embodiments of the invention are:
compounds of formula (1a), (1b) or (1c), wherein A and A' are identical;
compounds of formula (1 a), wherein X is chloro and X' is fluoro, and R' has the meanings and preferred meanings as previously given:
compounds of formula (1a), wherein X is chloro and X' is fluoro, A and A' are identical, and R' has the meanings and preferred meanings as previously given;
compounds of formula (1b), wherein X is chloro and X' is fluoro, and R' has the meanings and preferred meanings as previously given;
compounds of formula (1c), wherein X is chloro and X' is fluoro, and R' has the meanings and preferred meanings as previously given;
compounds of formula (1c), wherein X is chloro and X' is fluoro, A and A' are identical, and R' has the meanings and preferred meanings as previously given.

The reactive dyes of formula (1) can be prepared in per se known manner, typically by coupling c. 1 molar equivalent of a diazotised compound of formula

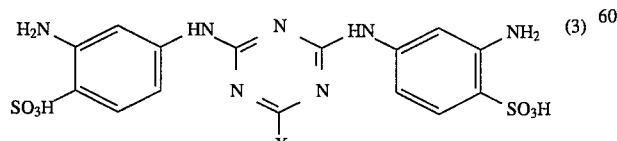

in any order, with c. 1 molar equivalent of a compound of formula

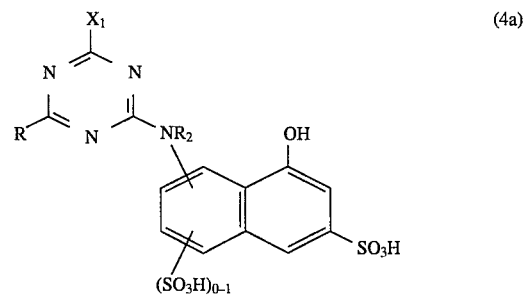

and c. 1 molar equivalent of a compound of formula

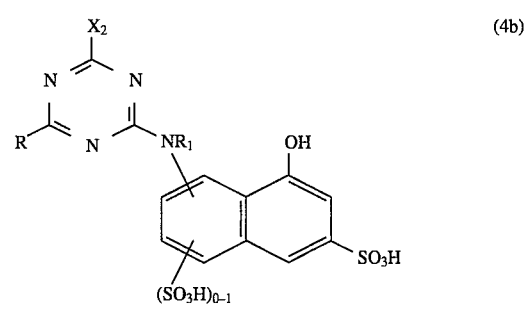

in which formulae above R, R', $R_1$, $R_2$, X, $X_1$ and $X_2$ are each as defined previously.

If the compounds of formulae (4a) and (4b) are identical compounds, then it is advantageous to react c. 1 molar equivalent of a diazotised compound of formula (3) with c. 2 molar equivalents of a compound of formula (4a).

The compounds of formula (3) are known or they can be prepared in a manner which is known per se.

It is preferred to prepare the compounds of formulae (4a) and (4b) beforehand in per se known manner by reacting c. 1 molar equivalent of a compound of formula

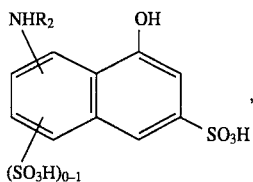

(5)

preferably of I-, J-, K- and, most preferably, H-acid, c.1 molar equivalent of a halotriazine, preferably 2,4,6-trichloro-s-triazine or 2,4,6-trifluoro-s-triazine, and c. 1 molar equivalent of a compound of formula $$R-H \quad (6a)$$

or $$R'-H, \quad (6b)$$

wherein R, R' and $R_2$ are each as previously defined, in any order.

As the order may differ in which the individual process steps described above can be carried out, and in some cases may also be carried out simultaneously, different variants of the process are possible. Usually the process is carried out stepwise in succession, with the sequence of the simple per se known reactions between the individual reactants depending on the particular conditions.

The invention further relates to a process for dyeing and printing cellulosic fibre materials with the novel dyes. Suitable fibre materials are typically natural cellulose fibres such as cotton, linen and hemp, as well as cellulose and regenerated cellulose. The dyes are also suitable for dyeing and printing hydroxyl-group containing fibres that are components of fibre blends, typically blends of cotton and polyamide fibres or, preferably, polyester fibres.

The novel dyes can be applied to, and fixed on, the fibre material by a wide variety of means, preferably in the form of aqueous dye solutions or print pastes. They are suitable for dyeing by the exhaust process as well as by the pad process, in which the goods are impregnated with aqueous dye solutions which may or may not contain salt, and the dyes are fixed after treatment with alkali or in the presence of alkali, with or without the application of heat. After fixation, the dyeings or prints are thoroughly washed with cold and hot water, with or without the addition of an agent that acts as a dispersant and promotes the diffusion of unfixed dye. Dyeing and printing are carded out by the conventional dyeing and printing methods.

In the process of this invention, the amounts in which the reactive dyes are used in the dyebaths or print pastes may vary in accordance with the desired depth of shade. Amounts of 0.01 to 10% by weight, preferably 0.1 to 6% by weight, based on the goods to be dyed, have been found useful.

The dye liquors may contain the standard additives, typically aqueous solutions of inorganic salts, e.g. of alkali metal chlorides or alkali metal sulfates, alkali metal hydroxides, urea, thickeners such as alginate thickeners, water-soluble cellulose alkyl ethers as well as dispersants, levelling agents and migration inhibitors, also sodium m-nitrobenzenesulfonate, and may contain as further thickeners conveniently methyl cellulose, starch ethers, emulsion thickeners, preferably an alginate such as sodium alginate, as well as wetting agents.

It is preferred to carry out the process of this invention by the exhaust process. In this process, dyeing is usually carded out in aqueous medium at a liquor to goods ratio of 1:2 to 1:60, preferably of 1:5 to 1:20, and at a pH of conveniently 6 to 13, and in the temperature range from typically 40° to 110° C., preferably from 60° to 95° C.

The novel dyes are distinguished by good fixation and have very good build-up. They have superior exhaustion properties and can be used for dyeing by the exhaust process over a very wide temperature range and are therefore suitable for dyeing cotton/polyester blends under the conditions recommended for such fabrics. The novel dye mixtures are also suitable for printing, especially on cotton, or on blended fabrics that contain e.g. wool or silk.

The dyeings and prints obtained on cellulosic fabrics with the novel dyes are of high tinctorial strength and have excellent fibre to dye bonding stability in the acid as well as in the alkaline range. They additionally have good lightfastness and very good wetfastness properties, including fastness to washing, water, seawater, cross-dyeing and persipiration, as well as good fastness to pleating and ironing.

The invention is illustrated by the following Examples in which, unless otherwise stated, parts and percentages are by weight. The ratio of parts by weight to parts by volume is the same as that of the kilogram to the liter.

EXAMPLE 1

31.9 parts of 1-amino-8-hydroxynaphthalene-3,6-disulfonic acid (H-acid) are dissolved in 800 ml of water to give a neutral solution The solution is cooled to 0°–5° C. and at this temperature 14.2 parts of 2,4,6-trifluoro-1,3,5-triazine are added dropwise over c. 20 minutes, while keeping the pH weakly acid to Congo red by the simultaneous addition of 2N sodium hydroxide. After addition of a mixture, adjusted to pH 5, of 13.3 parts of N-ethylaniline in 100 parts of water, the pH of the reaction mixture is first kept for a brief time weakly acid to Congo red by the constant addition of 2N sodium hydroxide and is then kept at pH 5–6. The temperature is simultaneously raised to 20°–25° C. over 2–3 hours.

When the reaction is complete, the intermediate is coupled at 0°–10° C. and pH 5 with the tetraazo compound of 24.5 parts of the compound of formula

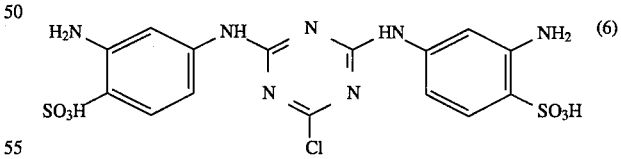

After the coupling reaction has gone to completion at pH 7, the reaction mixture is clarified and the resultant reactive dye of formula

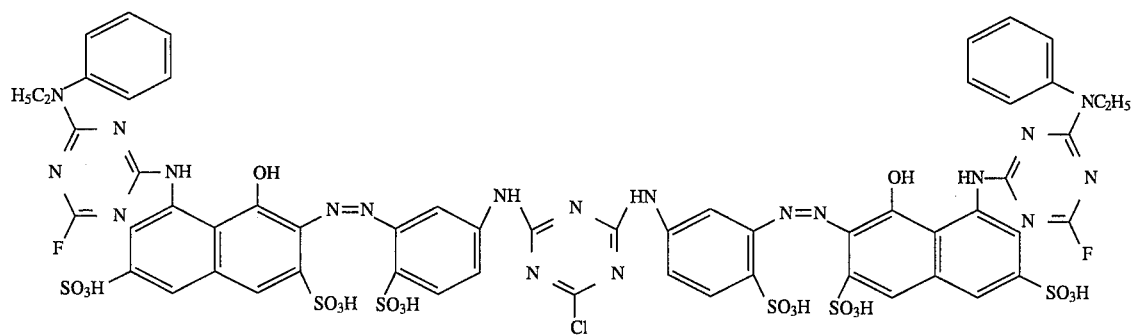

is isolated by concentration or lyophilisation of the reaction solution at pH 7. It dyes cotton in red shades of good allround fastness properties.

EXAMPLES 2 to 13

Further dyes of the general formula

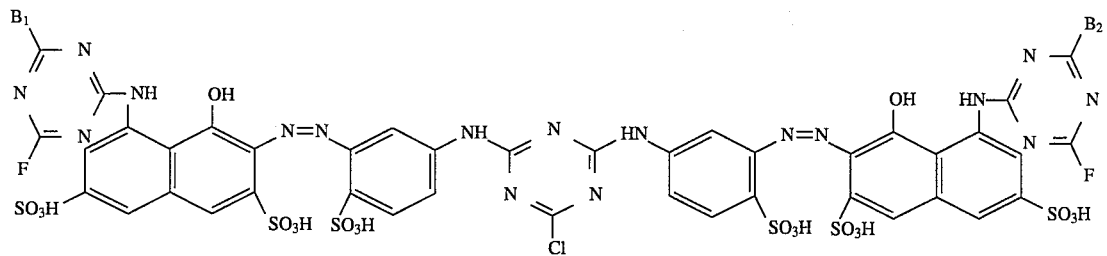

wherein $B_1$ and $B_2$ are as defined in Table 1, can be prepared in a manner analagous to that described in Example 1:

TABLE 1

| Example No. | $B_1$ | $B_2$ |
|---|---|---|
| 2 | morpholino–N— | morpholino–N— |
| 3 | C₆H₅N(CH₃)— | C₆H₅N(CH₃)— |
| 4 | 3-HO₃S-C₆H₄-HN— | 3-HO₃S-C₆H₄-HN— |
| 5 | C₆H₅N(C₂H₅)— | C₆H₅N(CH₃)— |
| 6 | morpholino–N— | C₆H₅N(CH₃)— |
| 7 | morpholino–N— | C₆H₅N(C₂H₅)— |
| 8 | C₆H₅N(C₂H₅)— | 3-HO₃S-C₆H₄-HN— |
| 9 | H₂N— | H₂N— |
| 10 | H₅C₂—HN— | H₅C₂—HN— |
| 11 | 4-methylpiperazin-1-yl— | 4-methylpiperazin-1-yl— |

TABLE 1-continued

| Example No. | B₁ | B₂ |
|---|---|---|
| 12 | Ph-N(C₂H₄-OH)- | Ph-N(C₂H₄-OH)- |
| 13 | HO₃S-C₆H₄-HN- | HO₃S-C₆H₄-HN- |

EXAMPLES 14 to 19

Further dyes of the general formula

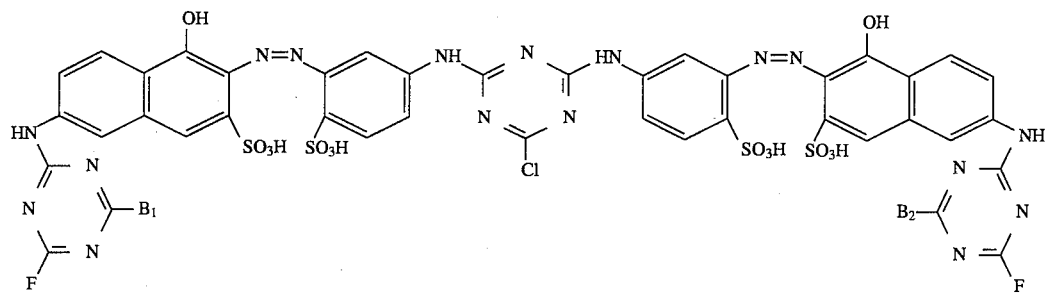

wherein $B_1$ and $B_2$ are as defined in Table 2, can be prepared in a manner analogous to that described in Example 1:

TABLE 2

| Example No. | B₁ | B₂ |
|---|---|---|
| 14 | morpholino-N- | 2,4-(SO₃H)₂-C₆H₃-HN- |
| 15 | 3-HO₃S-C₆H₄-HN- | 3-HO₃S-C₆H₄-HN- |
| 16 | 2,4-(SO₃H)₂-C₆H₃-HN- | 2,4-(SO₃H)₂-C₆H₃-HN- |
| 17 | 4-HO₃S-C₆H₄-HN- | 4-HO₃S-C₆H₄-HN- |
| 18 | 4-HO₃S-C₆H₄-HN- | 2,4-(SO₃H)₂-C₆H₃-HN- |
| 19 | Ph-N(C₂H₅)- | 2,4-(SO₃H)₂-C₆H₃-HN- |

EXAMPLES 20 to 32

The procedure as described in Examples 1 to 13 is repeated, replacing the compound of formula 6 with an equivalent amount of the compound of formula $$H_2N-C_6H_3(SO_3H)-NH-C(=N-)-N=C(OH)-N=C(-NH-C_6H_3(SO_3H)-NH_2)$$  (6a)

to give the dyes of the general formula

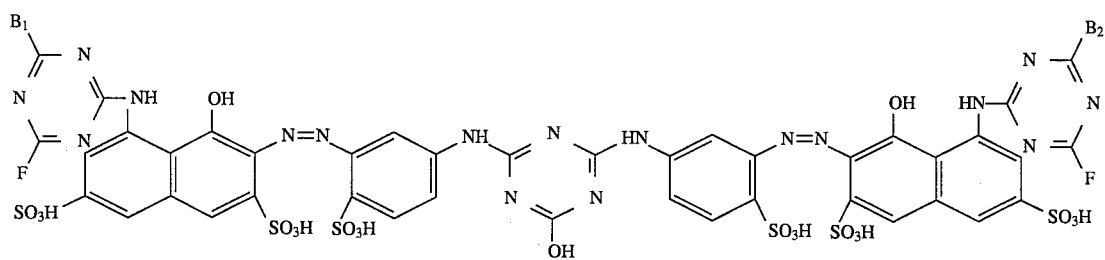

wherein $B_1$ and $B_2$ are as defined in Table 3:

TABLE 3

| Example No. | $B_1$ | $B_2$ |
|---|---|---|
| 20 | O⟨ ⟩N— (morpholino) | O⟨ ⟩N— (morpholino) |
| 21 | C₆H₅–N(CH₃)– | C₆H₅–N(CH₃)– |
| 22 | 3-HO₃S-C₆H₄–HN– | 3-HO₃S-C₆H₄–HN– |
| 23 | C₆H₅–N(C₂H₅)– | C₆H₅–N(CH₃)– |
| 24 | morpholino | C₆H₅–N(CH₃)– |
| 25 | morpholino | C₆H₅–N(C₂H₅)– |
| 26 | C₆H₅–N(C₂H₅)– | 3-HO₃S-C₆H₄–HN– |
| 27 | H₂N— | H₂N— |
| 28 | H₅C₂—HN— | H₅C₂—HN— |
| 29 | H₃C—N⟨ ⟩N— (N-methylpiperazino) | H₃C—N⟨ ⟩N— (N-methylpiperazino) |
| 30 | C₆H₅–N(C₂H₄–OH)– | C₆H₅–N(C₂H₄–OH)– |
| 31 | 4-HO₃S-C₆H₄–HN– | 4-HO₃S-C₆H₄–HN– |
| 32 | C₆H₅–N(C₂H₅)– | C₆H₅–N(C₂H₅)– |

EXAMPLES 33 to 35

The procedure as described in Examples 1 to 3 is repeated, replacing H-acid with the equivalent amount of 1-amino-8-hydroxynaphthalene-4,6-disulfonic acid (K-acid), to give the dyes of the general formula

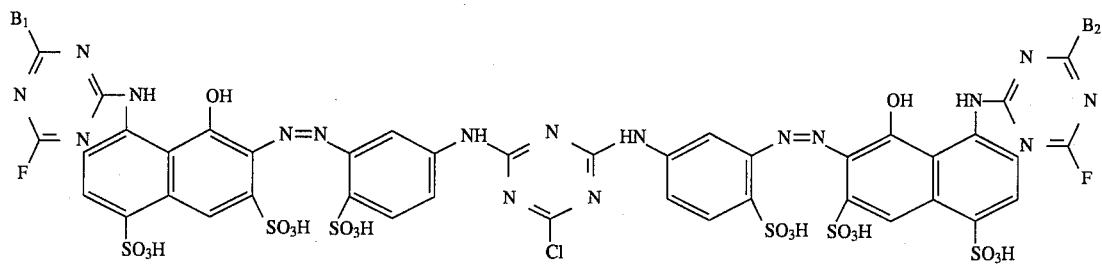

wherein $B_1$ and $B_2$ are as defined in Table 4:

TABLE 4

| Example No. | $B_1$ | $B_2$ |
|---|---|---|
| 33 | O( )N— (morpholino) | O( )N— (morpholino) |
| 34 | C₆H₅–N(CH₃)– | C₆H₅–N(CH₃)– |
| 35 | C₆H₅–N(C₂H₅)– | C₆H₅–N(C₂H₅)– |

EXAMPLES 36 to 38

The procedure as described in Examples 1 to 3 is repeated, replacing H-acid with the equivalent amount of K-acid and the compound of formula (6) with the equivalent amount of the compound of formula (6a), to give the dyes of the general formula

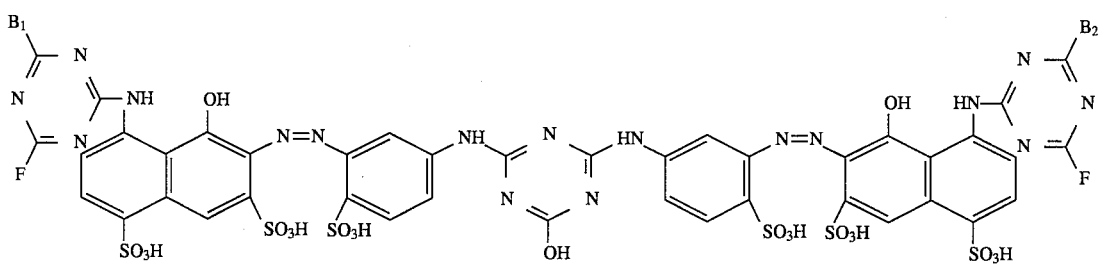

wherein $B_1$ and $B_2$ are as defined in Table 5:

TABLE 5

| Example No. | $B_1$ | $B_2$ |
|---|---|---|
| 36 | O( )N— (morpholino) | O( )N— (morpholino) |
| 37 | C₆H₅–N(CH₃)– | C₆H₅–N(CH₃)– |
| 38 | C₆H₅–N(C₂H₅)– | C₆H₅–N(C₂H₅)– |

EXAMPLE 39

2 parts of the reactive dye obtained in Example 1 are dissolved in 400 parts of water. To this solution are added 1500 parts of a solution which contains 53 g/l of sodium chloride. Then 100 parts of cotton fabric are put into this dyebath at 40° C., followed by the addition after 45 minutes of 100 parts of a solution containing 16 g/l of sodium hydroxide and 20 g/l of anhydrous $Na_2CO_3$. The temperature of the dyebath is kept at 40° C. for a further 45 minutes. The red dyed goods are then rinsed, soaped at the boil for ¼ hour with a nonionic detergent, rinsed once more and dried.

The dyed fabric has very good fastness properties.

EXAMPLE 40

2 parts of the reactive dye obtained in Example 2 are dissolved in 400 parts of water. To this solution are added 1500 parts of a solution which contains 53 g/l of sodium chloride. Then 100 parts of cotton fabric are put into this dyebath at 35° C., followed by the addition after 20 minutes of a solution containing 16 g/l of sodium hydroxide and 20 g/l of anhydrous $Na_2CO_3$. The temperature of the dyebath is kept at 35° C. for a further 15 minutes. The temperature is then raised to 60° C. over 20 minutes and kept at 60° C. for a further 35 minutes. The red dyed goods are then rinsed, soaped at the boil for 1/4 hour with a nonionic detergent, rinsed once more and dried. The dyed fabric has very good fastness properties.

EXAMPLE 41

8 parts of the dye obtained in Example 15 are dissolved in 400 pans of water. To this solution are added 1400 parts of a solution which contains 100 g/l of sodium sulfate. Then 100 parts of cotton fabric are put into this dyebath at 25° C., followed by the addition after 10 minutes of 200 pans of a solution containing 150 g/l of trisodium phosphate. The temperature of the dyebath is then raised to 60° C. over 10 minutes and kept at 60° C. for a further 90 minutes. The orange dyed goods are then rinsed, soaped at the boil for 1/4 hour with a nonionic detergent, rinsed once more and dried. The dyed fabric has very good fastness properties.

EXAMPLE 42

4 parts of the dye obtained in Example 1 are dissolved in 50 pans of water. To this solution are added 50 pans of a solution which contains 5 g/l of sodium hydroxide and 20 g/l of anhydrous $Na_2CO_3$. A cotton fabric is impregnated with this solution to a pick-up of 70% and then rolled up. The cotton fabric is stored for 3 hours at room temperature. The red dyed goods are then rinsed, soaped at the boil for 1/4 hour with a nonionic detergent, rinsed once more and dried. The dyed fabric has very good fastness properties.

EXAMPLE 43

6 parts of the dye obtained in Example 14 are dissolved in 50 pans of water. To this solution are added 50 parts of a solution which contains 16 g/l of sodium hydroxide and 0.4 liter of water glass (38° Bé). A cotton fabric is impregnated with this solution to a pick-up of 70% and then rolled up. The cotton fabric is stored for 10 hours at room temperature. The orange dyed goods are then rinsed, soaped at the boil for 1/4 hour with a nonionic detergent, rinsed once more and dried. The dyed fabric has very good fastness properties.

EXAMPLE 44

2 parts of the dye obtained in Example 3 are dissolved in 100 pans of water by adding 0.5 pan of sodium m-nitrobenzenesulfonate. A cotton fabric is impregnated with this solution to a liquor pick-up of 75% and then dried. The fabric is then impregnated with a warm solution of 20° C. which contains 4 g/l of sodium hydroxide and 300 g/l of sodium chloride, and then expressed to a pick-up of 75%. The red dyeing is steamed for 30 seconds at 100°–102° C., rinsed, soaped at the boil for 1/4 hour with a nonionic detergent, rinsed once more and dried. The dyed fabric has very good fastness properties.

EXAMPLE 45

With rapid stirring, 3 pans of the dye obtained in Example 1 are strewed into 100 pans of a stock thickening which contains 50 pans of 5% sodium alginate thickener, 27.8 pans of water, 20 pans of urea, 1 pan of sodium m-nitrobenzenesulfonate and 1.2 pans of sodium hydrogencarbonate. A cotton fabric is printed with the resultant printing paste and dried. The printed fabric is steamed for 2 minutes at 102° C. in saturated steam, then rinsed, if necessary soaped at the boil and rinsed once more and dried. The printed fabric has very good fastness properties.

EXAMPLE 46

With rapid stirring, 5 pans of the dye obtained in Example 15 are strewed into 100 pans of a stock thickening which contains 50 pans of 5% sodium alginate thickener, 36.5 pans of water, 10 pans of murea, 1 pan of sodium m-nitrobenzenesulfonate and 2.5 pans of sodium hydrogencarbonate. A cotton fabric is printed with the resultant printing paste whose stability meets the technical requirements, and dried. The orange printed fabric is steamed for 8 minutes at 102° C. in saturated steam, then rinsed, if necessary soaped at the boil and rinsed once more and dried. The printed fabric has very good fastness properties.

What is claimed is:

1. A compound of the formula

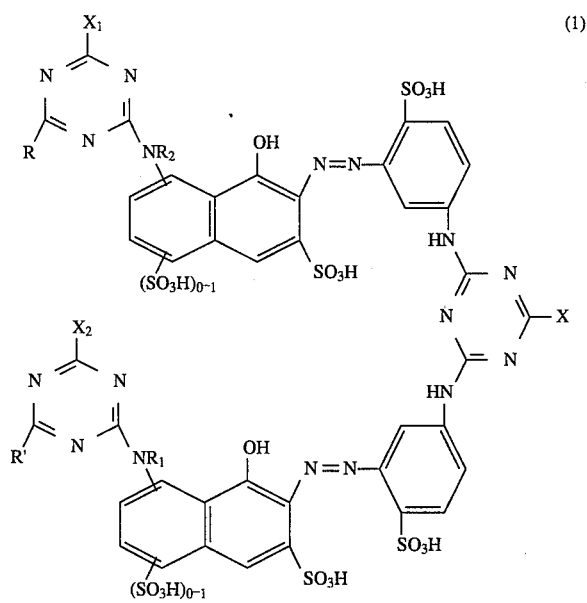

wherein

X, $X_1$ and $X_2$ are each independently of one another fluoro, chloro, bromo, hydroxy, 3-carboxypyrdin-1-yl or 3-carbamoylpyridin-1-yl, $R_1$ and $R_2$ are each independently of the other hydrogen, $C_1$–$C_4$alkyl or $C_1$–$C_4$alkyl which is substituted by halogen, hydroxy, cyano, $C_1$–$C_4$alkoxy, $C_1$–$C_4$alkoxycarbonyl, carboxyl, sulfo or sulfato, and R and R' are each independently of the other amino, N-mono- or N,N-di-$C_1$–$C_4$alkylamino each of which is unsubstituted or substituted in the alkyl moiety by hydroxy, carboxy, sulfo, sulfato or $C_1$–$C_4$alkoxy; cyclohexylamino; phenylamino or phenylamino which is substituted in the phenyl moiety by $C_1$–$C_4$alkyl, $C_1$–$C_4$alkoxy, carboxy, sulfo or halogen; N-$C_1$–$C_4$alkyl-N-phenylamino which is unsubstituted or substituted in the phenyl moiety by $C_1$–$C_4$alkyl, $C_1$–$C_4$alkoxy, carboxy, sulfo or halogen, and is unsubstituted or substituted in the alkyl moiety by hydroxy, $C_1$–$C_4$alkoxy, sulfo or sulfato, $C_1$–$C_4$alkoxy, phenoxy, $C_1$–$C_4$ alkylthio, N-$C_1$–$C_4$alkylpiperazino or morpholino.

2. A compound according to claim 1, wherein $R_1$ and $R_2$ are each independently of the other hydrogen.

3. A compound according to claim 1, wherein X, $X_1$ and $X_2$ are each independently of one another chloro or fluoro.

4. A compound according to claim 1, wherein X is chloro and $X_1$ and $X_2$ are each fluoro.

5. A compound according to claim 1, wherein R and R' are each independently of the other amino, N-mono- or N,N-di-$C_1$–$C_4$alkylamino which is unsubstituted or substituted in the alkyl moiety by hydroxy or sulfo; phenylamino which is unsubstituted or substituted in the phenyl moiety by methyl, ethyl, methoxy, ethoxy, carboxy, sulfo or chloro; N-$C_1$–$C_4$alkyl-N-phenylamino which is unsubstituted or substituted in the alkyl moiety by hydroxy; morpholino or N-$C_1$–$C_2$alkylpiperazino.

6. A compound according to claim 1, wherein R and R' are each independently of the other amino, N-$C_1$–$C_2$alkylamino, β-sulfoethylamino, β-hydroxyethylamino, N,N-di-β-hydroxyethylamino, o-, m- or p-sulfophenylamino, 2,5-disulfophenylamino, N-$C_1$–$C_2$alkyl-N-phenylamino, N-hydroxyethyl-N-phenylamino or N-$C_1$–$C_2$alkylpiperazino.

7. A compound according to claim 1, wherein R and R' are identical.

8. A compound according to claim 1 of formula

9. A compound according to claim 8, wherein X is chloro and X' is fluoro.

10. A compound according to claim 8 of formula (1a), wherein X is chloro and X' is fluoro and R' is amino, N-mono- or N,N-di-$C_1$–$C_4$alkylamino which is unsubstituted or substituted in the alkyl moiety by hydroxy or sulfo; phenylamino which is unsubstituted or substituted in the phenyl moiety by methyl, ethyl, methoxy, ethoxy, carboxy, sulfo or chloro; N-$C_1$–$C_4$alkyl-N-phenylamino which is unsubstituted or substituted in the alkyl moiety by hydroxy; morpholino or N-$C_1$–$C_2$alkylpiperazino.

11. A compound according to claim 8 of formula (1a), wherein X is chloro and X' is fluoro, A and A' are identical, and R' is amino, N-$C_1$–$C_2$alkylamino, β-sulfoethylamino, β-hydroxyethylamino, N,N-di-β-hydroxyethylamino, o-, m- or p-sulfophenylamino, 2,5-disulfophenylamino,

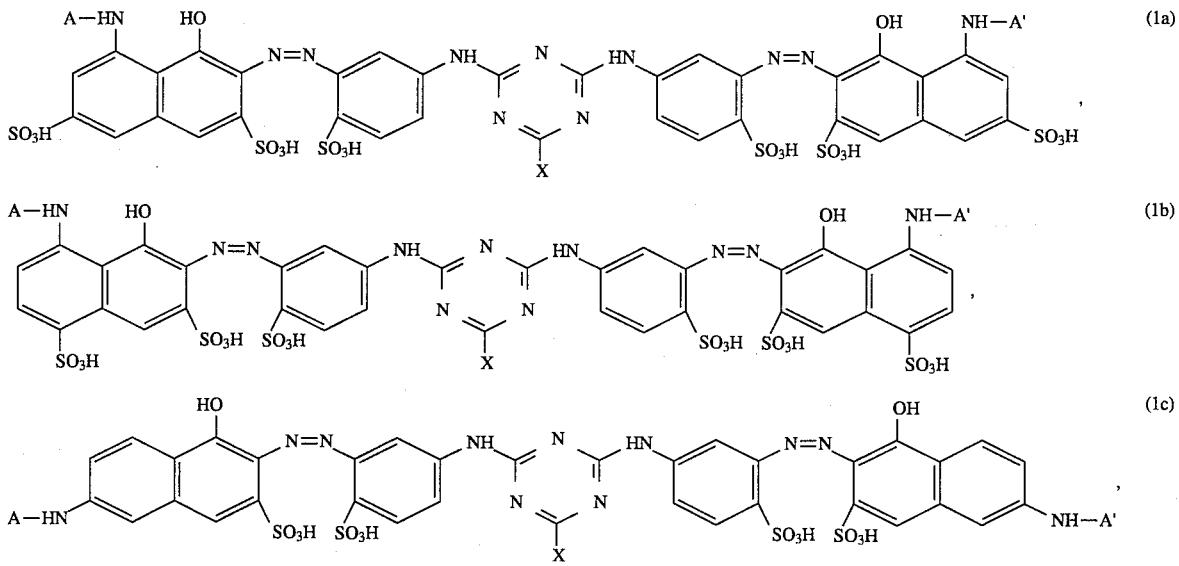

wherein A and A' are each independently of the other a radical of formula

X and X' are each independently of the other fluoro or chloro, and R' has the meaning given in claim 1.

N-$C_1$–$C_2$alkyl-N-phenylamino, N-hydroxyethyl-N-phenylamino or N-$C_1$–$C_2$alkylpiperazino.

12. A process for dyeing and printing cellulosic fibre material, which comprises treating said material in aqueous solution with a tinctorially effective amount of a dye of formula (1) as claimed in claim 1.

13. A process according to claim 12, wherein the cellulosic fibre material is cotton.

* * * * *